US007844753B2

(12) United States Patent
Cornett et al.

(10) Patent No.: US 7,844,753 B2
(45) Date of Patent: Nov. 30, 2010

(54) TECHNIQUES TO PROCESS INTEGRITY VALIDATION VALUES OF RECEIVED NETWORK PROTOCOL UNITS

(75) Inventors: Linden Cornett, Portland, OR (US); Parthasarathy Sarangam, Portland, OR (US); Sujoy Sen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1052 days.

(21) Appl. No.: 11/559,094

(22) Filed: Nov. 13, 2006

(65) Prior Publication Data

US 2008/0112402 A1  May 15, 2008

(51) Int. Cl.
*G06F 13/28* (2006.01)
*H04L 12/28* (2006.01)
*H04J 3/16* (2006.01)
*H04J 3/22* (2006.01)

(52) U.S. Cl. .......................... 710/22; 370/389; 370/465
(58) Field of Classification Search ............. 710/22
See application file for complete search history.

(56) References Cited

U.S. PATENT DOCUMENTS

| 7,000,170 | B2 | 2/2006 | Slutz et al. | |
|---|---|---|---|---|
| 2003/0058870 | A1 | 3/2003 | Mizrachi et al. | |
| 2004/0125806 | A1 | 7/2004 | Barzilai et al. | |
| 2005/0223134 | A1* | 10/2005 | Vasudevan et al. | 710/22 |
| 2005/0238019 | A1* | 10/2005 | Vasudevan et al. | 370/389 |
| 2006/0056435 | A1 | 3/2006 | Biran et al. | |

FOREIGN PATENT DOCUMENTS

WO   2008/063826 A1   5/2008

OTHER PUBLICATIONS

International Preliminary Report on Patentability for PCT Patent Application No. PCT/US2007/082914, mailed on May 28, 2009, 7 pages.
"International Search Report and Written Opinion", PCT/US2007/082914, (Apr. 28, 2008), 10 Pages.
Cisco Systems, Inc., "Introduction to iSCSI", 1992-2002 Cisco Systems, Inc., pp. 1-15.
J. Satran et al., "Internet Small Computer Systems Interface (iSCSI)", Network Working Group, Apr. 2004, http://www.ietf.org/rfc/rfc3720.txt, Section 10. ISCSI PDU Formats, 74 pages.

* cited by examiner

*Primary Examiner*—Chun-Kuan Lee
*Assistant Examiner*—Brooke J Dews
(74) *Attorney, Agent, or Firm*—Glen B Choi

(57) ABSTRACT

Techniques are described that can be used to support integrity validation of protocol data units. An iSCSI compatible logic may establish a memory region to store a header portion of the protocol data unit. In some implementations, the iSCSI compatible logic may read the header and determine a size of a second memory region to store a payload portion of the protocol data unit. In some implementations, the iSCSI compatible logic may set the second memory region as a maximum possible size of the payload portion. TCP compatible logic may include the capability to validate an integrity of the header or data portions of the protocol data unit. TCP compatible logic may request data mover logic to determine an integrity validation value for a header and/or data portion of the protocol data unit in the process of copying the protocol data unit to among the memory region or the second memory region. TCP compatible logic may compare the determined integrity validation value with an integrity validation value included with the protocol data unit.

22 Claims, 4 Drawing Sheets

TECHNIQUES TO PROCESS INTEGRITY VALIDATION VALUES OF RECEIVED NETWORK PROTOCOL UNITS

FIELD

The subject matter disclosed herein relates to techniques to process received network protocol units.

RELATED ART

Data communications systems typically utilize techniques to verify the integrity of received information. For example, to verify integrity of received packets, various protocols such as Remote Direct Memory Access (RDMA), Internet Small Computer System Interface (iSCSI), and Stream Control Transmission Protocol (SCTP) may involve calculation of cyclical redundancy checking (CRC) values over received packets and a comparison of the calculated CRC values with CRC values provided with the packets. For example, RDMA is described for example at www.rdmaconsortium.com as well as in An RDMA Protocol Specification, Version 1.0 (October 2002). iSCSI is described for example at RFC 3720: Internet Small Computer Systems Interface (iSCSI) (April 2004). SCTP is described for example at The Internet Society RFC-3286, An Introduction to the Stream Control Transmission Protocol (SCTP) (May 2002).

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
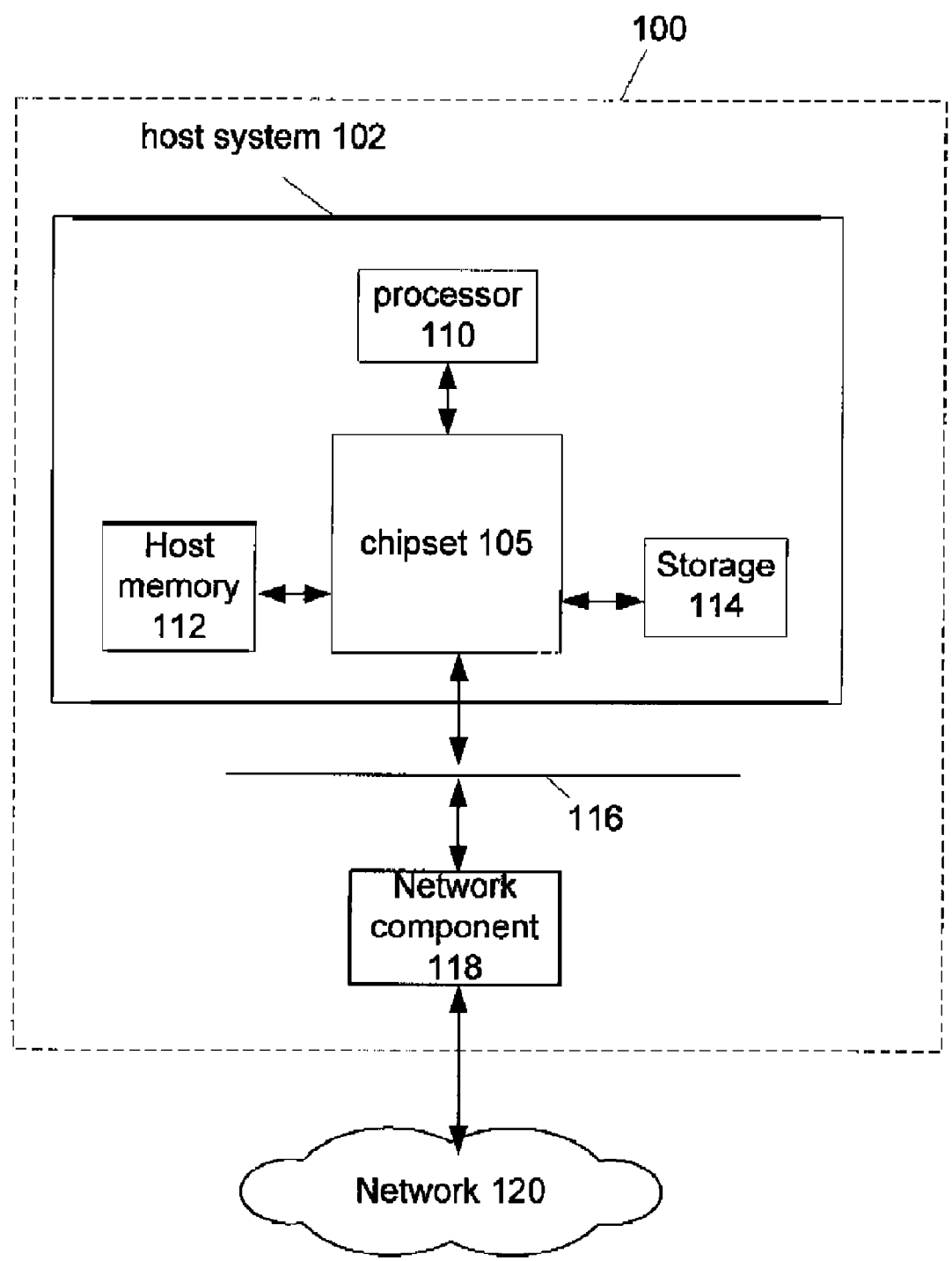
FIG. 1 depicts an example system embodiment in accordance with some embodiments of the present invention.

FIG. 1 depicts in computer system 100 a suitable system in which some embodiments of the present invention may be used. Computer system 100 may include host system 102, bus 116, and network component 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance at least with any of the following protocols: Small Computer Systems Interface (SCSI), Fibre Channel (FC), and/or Serial Advanced Technology Attachment (S-ATA).

In some embodiments, chipset 105 may include data mover logic capable to perform transfers of information within host system 102 or between host system 102 and network component 118. As used herein, a "data mover" refers to a module for moving data from a source to a destination without using the core processing module of a host processor, such as processor 110, or otherwise does not use cycles of a processor to perform data copy or move operations. By using the data mover for transfer of data, the processor may be freed from the overhead of performing data movements, which may result in the host processor running at much slower speeds. A data mover may include, for example, a direct memory access (DMA) engine. In some embodiments, data mover may be implemented as part of processor 110, although other components of computer system 100 may include the data mover. In some embodiments, data mover may be implemented as part of chipset 105.

In some embodiments, the data mover may include a capability to determine an integrity validation value or at least have the capability to access logic to determine an integrity validation value. The data mover may be capable to determine integrity validation values such as but not limited to CRC values and checksum. The data mover may be used to determine an integrity validation value over a header and/or data portion of an iSCSI protocol data unit (PDU) based on a seed value in host memory and write the integrity validation value result to the seed value memory location.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up synchronous DRAM (SDRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance at least with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more packets to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembe, Case postale 56 CH-1211 Geneva 20, Switzerland.

Network 120 may be any network such as the Internet, an intranet, a local area network (LAN), storage area network (SAN), a wide area network (WAN), or wireless network. Network 120 may exchange traffic with network component 118 using the Ethernet standard (described in IEEE 802.3 and related standards) or any communications standard. As used herein, a "network protocol unit" may include any packet or frame or other format of information with a header and payload portions formed in accordance with any protocol specification.

Figure 2:
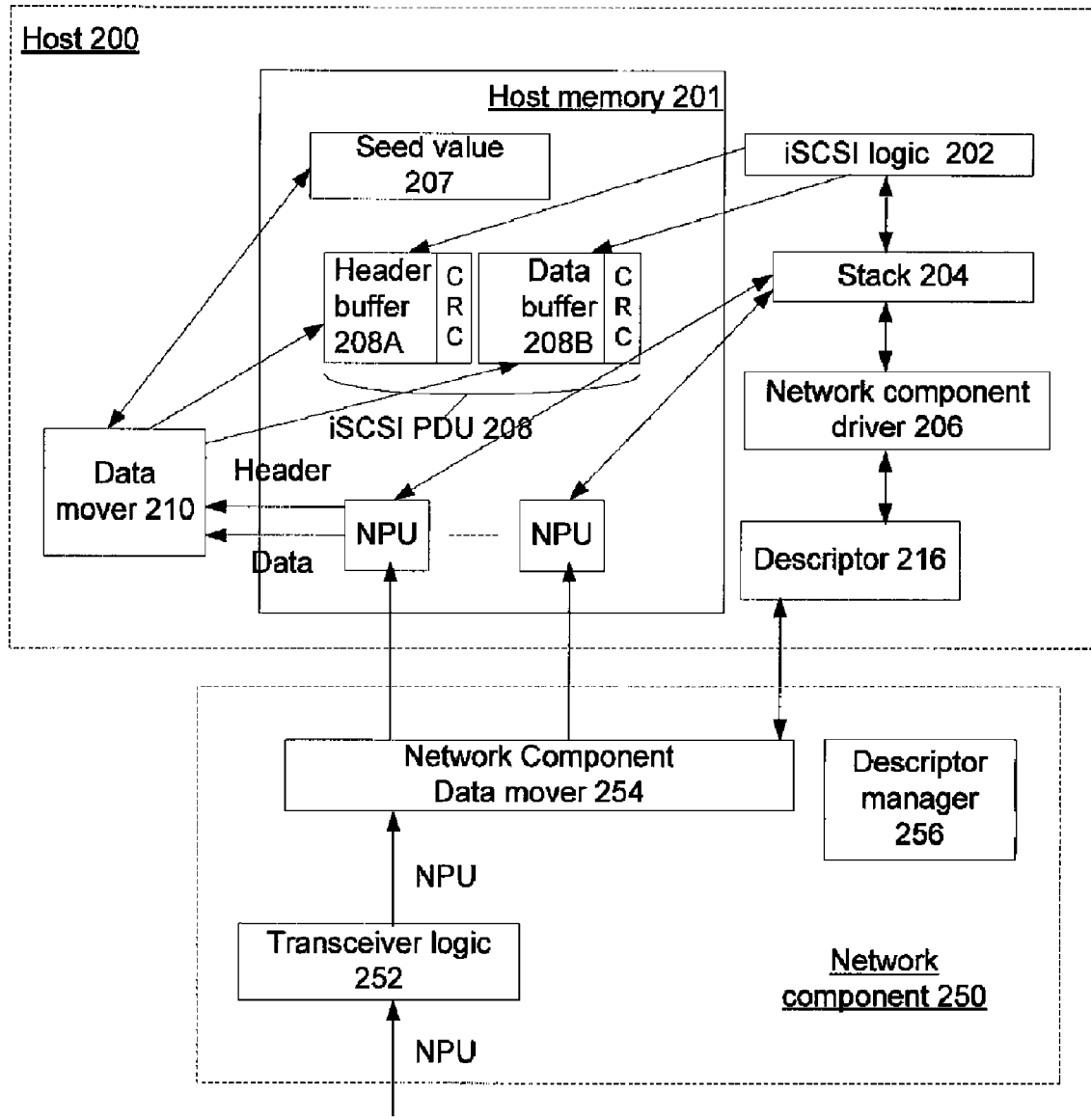
FIGS. 2 and 3 depict an example of interactive elements that can be used to process received network protocol units in accordance with some embodiments of the present invention.

FIG. 2 depicts an example of elements that can be used to process received network protocol units, in accordance with some embodiments of the present invention. In some embodiments, host 200 may include at least host memory 201, iSCSI logic 202, stack 204, network component driver 206, and data mover 210. Host 200 may include other logic (not depicted) such as but not limited to a processor, memory device, and storage device.

Based on the Internet Small Computer System Interface (iSCSI) protocol, iSCSI logic 202 expects that a header of a received iSCSI PDU is 48 bytes. The PDU may be received among one or more network protocol unit (NPU). Accordingly, iSCSI logic 202 posts header buffer 208A (i.e., starting location and size) within host memory 201 that is just large enough to store the iSCSI header and an integrity validation value for the header. Because the last four bytes of the header is an integrity validation value, iSCSI logic 202 knows that the last four bytes of header buffer 208A stores an integrity validation value for the header, In some embodiments, iSCSI logic 202 may post header buffer 208A prior to network component 250 receiving an iSCSI PDU by way of one or more NPU. iSCSI logic 202 may indicate to stack 204 the location of header buffer 208A.

Stack 204 may request data mover 210 to transfer a header portion of a PDU among one or more NPU stored in host memory 201 to header buffer 208A. The one or more NPU may have been received by network component 250 and transferred into host memory 201. After the header portion is written into header buffer 208A, stack 204 may return use of header buffer 208A and indicate storage of a header to iSCSI logic 202.

In some embodiments, stack 204 may request data mover 210 to copy header of a PDU stored among one or more NPU in host memory 201 to header buffer 208A and request data mover 210 to determine an integrity validation value over the header using a seed value stored at a specified location. The seed value is shown as seed value 207. Seed value 207 may be used to store a seed for a single PDU and to accumulate integrity validation values determined over a single PDU that spans multiple NPUs. In some embodiments, data mover 210 may write the determined value to the same location which contained the seed value. An integrity validation value may be a CRC value, checksum, or any other value determined over a portion of a PDU.

iSCSI logic 202 may process the iSCSI header stored in header buffer 208A in accordance with iSCSI protocol processing and determine the length of the data portion of the PDU based on content in the iSCSI header. For example, iSCSI is described at least in IP Storage Working Group Internet Draft RFC 3720 entitled "Internet Small Computer Systems Interface (iSCSI)" (April 2004) and revisions thereof. Accordingly, rather than post a data buffer large enough to store the largest-size scenario of the data portion of a PDU, iSCSI logic 202 may post data buffer 208B in host memory 201 that is just large enough to store data and an integrity validation value for the data. Accordingly, by knowing the size of the data portion of a PDU, iSCSI logic 202 may know the location of an integrity validation value included with the data because under iSCSI, the last four bytes of the data portion are an integrity validation value.

iSCSI logic 202 may pass a descriptor to stack 204 for each buffer (e.g., header buffer 208A and/or data buffer 208B) indicating the buffer location (e.g., header buffer 208A and/or data buffer 208B) and the starting location in memory for integrity validation value associated with header and/or data. In some embodiments, determination of header and/or data integrity validation may be offloaded to other logic. An integrity validation value will be located in the last four bytes of each of header buffer 208A and data buffer 208B.

Stack 204 may request data mover 210 to copy the data portion of a PDU from one or more NPU in host memory 201 into data buffer 208B. In some embodiments, stack 204 may request data mover 210 to copy a data portion of a PDU from one or more NPU in host memory 201 to data buffer 208B and request data mover 210 to determine an integrity validation value over the data portion using a seed value stored at seed value 207. In some embodiments, data mover 210 may write the determined value to seed value 207. If multiple NPUs transfer a single iSCSI PDU, data mover 210 may accumulate the integrity validation value in seed value 207 until it reaches the end of the PDU. If there are multiple NPUs which transfer a single iSCSI PDU, the determined integrity validation value may be accumulated in seed value 207 until the end of the header or data portion of the PDU. In order to handle the case where header buffer 208A and/or data buffer 208B is posted in more than one post call to stack 204, descriptor semantics that can be defined to allow the data over which the integrity validation value is to be calculated to span multiple NPUs.

In some embodiments, stack 204 may be capable to determine TCP/IP protocol compliance for one or more received NPU in accordance TCP. For example, the TCP/IP protocol is described at least in the publication entitled "Transmission Control Protocol: DARPA Internet Program Protocol Specification," prepared for the Defense Advanced Projects Research Agency (RFC 793, published September 1981).

After data mover 210 determines an integrity validation value over the entire header, stack 204 may compare the determined integrity validation value with the value included with the header using the integrity validation value from header buffer 208A. Under iSCSI, integrity validation values in a PDU may be located among the last 4 bytes of the header portion and among the last 4 bytes of the data portion. If the determined integrity validation value matches the integrity validation value included with the header, then the header passes. If the determined integrity validation value does not match the integrity validation value included with the header, then the PDU fails. Similar techniques can be used to determine pass or fail for the data portion of the PDU using an integrity validation value for the data portion from data buffer 208B. In some embodiments, stack 204 may indicate pass/fail of the validation to iSCSI logic 202, for example, when it returns the posted buffer(s) associated with the PDU to iSCSI logic 202.

In some embodiments, instead of stack 204 comparing the determined integrity validation value for the header and/or data portion with the integrity validation value(s) for the header and/or data portion received with the PDU, data mover 210 may include or have access to logic capable to compare the determined integrity validation value with an integrity validation value(s) received in a network protocol unit. Stack 204 may instruct data mover 210 to compare the determined integrity validation value(s) with the integrity validation value(s) received in a PDU. When instructed, data mover 210 may compare the determined integrity validation value with the integrity validation value received with a PDU. Data mover 210 may indicate a pass/fail indication for header and/or data portions of a PDU to stack 204. In some embodiments, determination of whether data mover 210 has completed determination and/or validation of an integrity validation value can be made by polling or interrupts, When instructed, data mover 210 may determine an integrity validation value over a header and/or data using an integrity validation seed value in host memory and prior to writing the header or data to respective header buffer 208A or data buffer 208B. In some embodiments, stack 204 provides the location of the integrity validation seed value to data mover 210. In some embodiments, stack 204 provides the integrity validation seed value to data mover 210. In some embodiments, determination of an integrity validation value may use table lookup and/or arithmetic-logic-unit operations. In some embodiments, determination of an integrity validation value may include calculations and/or uses of look-up-tables.

Network component driver 206 may receive descriptors from network component 250 that indicate pointer(s) to locations within host memory that are capable to store a one or more received network protocol unit (NPU). Host memory 201 may store one or more NPU received by network component 250.

In some embodiments, network component 250 may include a transceiver logic 252, network component data mover 254, and descriptor manager 256. Transceiver logic 252 may be capable to receive network protocol units through a physical medium and transmit network protocol units through a physical medium. The physical medium may be a coaxial cable, wire-line, fiber optic cable, or other signal propagation medium. Alternatively or in addition, transceiver logic 252 may be capable to receive and transmit signals using wireless techniques. For example, transceiver logic 252 may receive and transmit network protocol units in conformance with applicable protocols such as Ethernet as described in IEEE Standard 802.3 (2002) and revisions thereof, although other protocols may be used. Transceiver logic 252 may be used to perform media access control operations as prescribed by applicable protocols such as Ethernet, although other protocols may be used, as well as other protocol-related processing.

Network component data mover 254 may transfer one or more NPU received by network component 250 to host memory 201. Descriptor manager 256 may receive one or more descriptor 216 from host 200. Descriptor manager 256 may modify one or more descriptor 216 to describe a storage location of a received network protocol unit in host memory 201. Descriptor manager 256 may provide the modified one or more descriptor 216 to host 200 to indicate storage of a NPU into memory 201.

Figure 3:
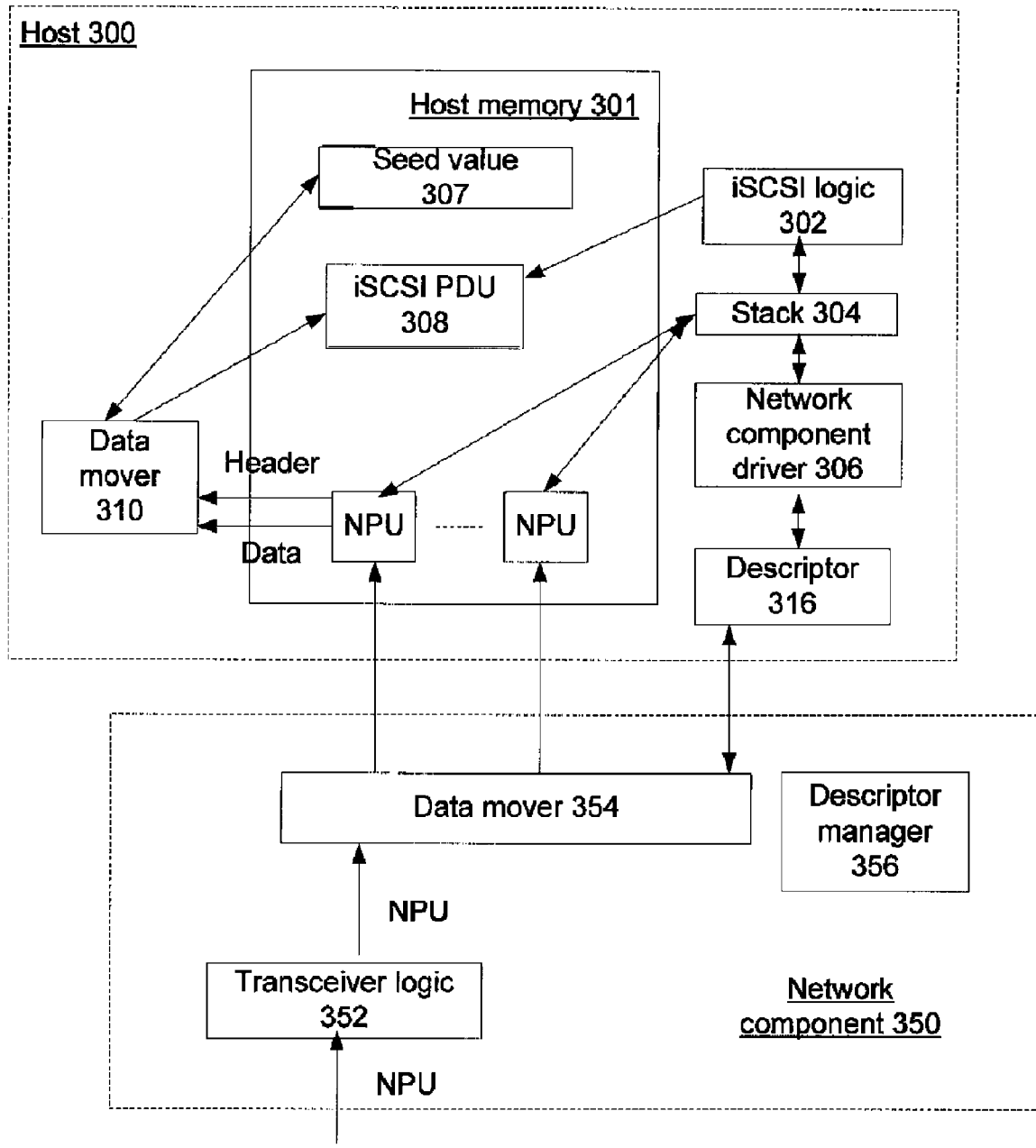

FIG. 3 depicts an example of interactive elements that can be used to process received network protocol units in accordance with some embodiments of the present invention, In some embodiments, host 300 may include at least host memory 301, iSCSI logic 302, stack 304, network component driver 306, and data mover 310, Host 300 may include other logic (not depicted) such as but not limited to a processor, memory device, and storage device.

In some embodiments, iSCSI logic 302 may set a buffer region (e.g., starting location and size) for a PDU (shown as iSCSI PDU 308) prior to arrival of the PDU by way of one or more NPU at network component 350. In some embodiments, iSCSI logic 302 may set a location to store the data portion of the PDU for iSCSI PDU 308 at any time before completion of copying of a header of the PDU into iSCSI PDU 308. In some embodiments, iSCSI logic 302 does not predict the size of the data portion of a PDU and iSCSI PDU 308 sets a maximum size for the data portion of the PDU in iSCSI PDU 308 under applicable protocols.

iSCSI logic 302 may provide an indication to stack 304 that a given connection is an iSCSI connection along with a request to offload integrity validation value determination to data mover 310 as well as an indication of whether determination of the header and/or data integrity validation value are to be offloaded to data mover 310. iSCSI logic 302 may further indicate that the next iSCSI PDU buffer posted on the connection is to contain the start of an iSCSI header.

In some embodiments, stack 304 determines locations of integrity validation value(s) within a PDU. Under iSCSI, the last 4 bytes of header and data portions of a PDU are integrity validation values. By inspecting a TCP byte stream, stack 304 may determine where an iSCSI PDU starts. When the header is a fixed size and the last 4 bytes of the header is an integrity validation value, the location of the integrity validation value of the header can be located. The header may indicate the size of the data portion of the PDU. Stack 304 may determine the location of the data integrity validation for the data portion by inspecting the header and because the integrity validation value for the data portion can located in the last 4 bytes of the data portion.

Stack 304 may request determination by data mover 310 of an integrity validation value over a header and/or data portions of a received PDU. Stack 304 may identify location(s) of an integrity validation value for the header and/or data portion of a PDU in received NPUs used to validate the integrity validation values determined by data mover. The identified locations of integrity validation values may be in iSCSI PDU 308. Stack 304 may further indicate to data mover 310 location(s) in which to store header and/or data portions of a PDU in iSCSI PDU 308.

In some embodiments, stack 304 may be capable to determine TCP/IP protocol compliance for one or more received NPU in accordance TCP/IP.

In some embodiments, stack 304 may allocate a memory location to be used to accumulate the integrity validation value determined by data mover 310 (shown as "seed value 307"). In some embodiments, stack 304 may allocate seed value 307 and provide the location of seed value 307 to a driver for data mover 310. In some embodiments, the integrity validation seed value location is indicated by stack 304. In some embodiments, the integrity validation seed value is provided by stack 304. Stack 304 may provide one or more descriptor to data mover 310 to request data mover 310 to copy a portion of one or more PDU stored in one or more NPU into PDU buffer 308 and instruct data mover 310 to determine an integrity validation value for the header and/or data using a seed value stored in seed value 307. In some embodiments, data mover 310 may write the determined value to the same location which contained the seed value (i.e., seed value 307).

Stack 304 may compare the determined integrity validation value for the header and/or data with the value included with the respective header and/or data portion of the PDU. If the determined integrity validation value for the header and/or data portion matches the integrity validation value received in the respective header and/or data portion of the PDU, then the received PDU passes. If the determined integrity validation value for the header and/or data portion does not match the integrity validation value received in the respective header and/or data portion of the PDU, then the received PDU fails. In some embodiments, stack 304 may indicate a pass/fail indication to iSCSI logic 302, for example, when it returns use of iSCSI PDU 308 to iSCSI logic 302.

In some embodiments, instead of stack 304 comparing the determined integrity validation value with the integrity validation value included with a PDU, data mover 310 may include logic capable (or have access to such logic) to compare the determined integrity validation value with an integrity validation value received in a PDU. Stack 304 may instruct data mover 310, via a descriptor, to compare the determined integrity validation value with the integrity validation value received in the PDU. Stack 304 may identify to data mover 310 location(s) of an integrity validation value for the header and/or data portion of a PDU in received NPUs used to validate the integrity validation values determined by data mover. The identified locations of integrity validation values may be in iSCSI PDU 308. When instructed via a descriptor field, data mover 310 may compare determined integrity validation values for header and/or data portions of a PDU with respective header and/or data integrity validation values received in a PDU. Data mover 310 indicates a pass/fail indication to stack 304. Determination of whether data mover 310 has completed determination and/or validation of an integrity validation value can be made by polling or interrupts.

Data mover 310 may determine an integrity validation value using an integrity validation seed value in host memory and prior to writing header or data portions of the PDU to iSCSI PDU 308.

Network component driver 306 may receive descriptors from network component 350 that indicate pointer(s) to locations within host memory that are capable to store a one or more received network protocol unit (NPU). Host memory 301 may store one or more NPU received by network component 350.

In some embodiments, network component 350 may include a transceiver logic 352, data mover 354, and descriptor manager 356. Transceiver logic 352 may be capable to receive network protocol units through a physical medium and transmit network protocol units through a physical medium. The physical medium may be a coaxial cable, wireline, fiber optic cable, or other signal propagation medium. Alternatively or in addition, transceiver logic 352 may be capable to receive and transmit signals using wireless techniques. For example, transceiver logic 352 may receive and transmit network protocol units in conformance with applicable protocols such as Ethernet as described in IEEE Standard 802.3 (2002) and revisions thereof, although other protocols may be used. Transceiver logic 352 may be used to perform media access control operations as prescribed by applicable protocols such as Ethernet, although other protocols may be used, as well as other protocol-related processing.

Data mover 354 may transfer one or more NPU received by network component 350 to host memory 301. Descriptor manager 356 may receive one or more descriptor 316 from host 300 Descriptor manager 356 may modify one or more descriptor 316 to describe a storage location of a received network protocol unit in host memory 301. Descriptor manager 356 may provide the modified one or more descriptor 316 to host 300 to indicate storage of a NPU into memory 301.

Figure 4:
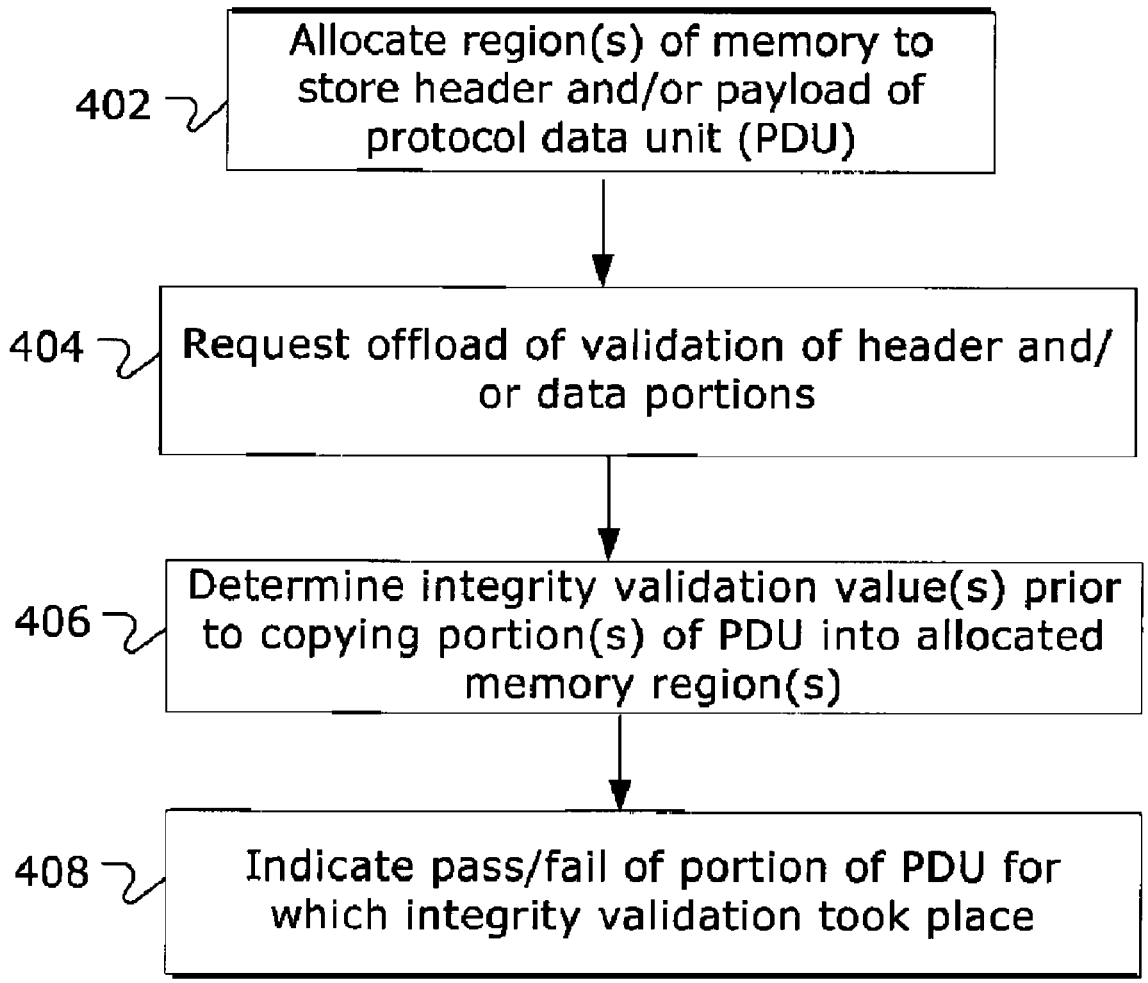
FIG. 4 depicts an example of a flow diagram that can be used to process received network protocol units in accordance with some embodiments of the present invention.

FIG. 4 depicts an example flow diagram that can be used to determine and/or validate one or more integrity validation value included with a received PDU.

Block 402 may include allocating region(s) in memory to store header and/or data portions of a protocol data unit (PDU). The header and/or data portions of a PDU may have been received in multiple TCP compliant network protocol units. In some embodiments, the region to store the header portion may be set at the maximum size for a PDU under the iSCSI protocol. The final four bytes of the region to store the header portion may store an integrity validation value for the header portion. In some embodiments, a second region in memory to store the data portion of the PDU may be determined based on inspection of the header portion. The size of the data portion of the PDU may be indicated in the header. The size of the second region in memory to store the data portion of the PDU may be set to the indicated size of the data portion. In some embodiments, the second region is set to a maximum size of the data portion of the PDU. The final four bytes of the second region may store an integrity validation value for the data portion.

Block 404 may include an iSCSI stack requesting validation of integrity validation value(s) associated with header and/or data portions of a PDU. Determination of integrity validation value(s) for header and/or data portions of a PDU may take place in logic accessible to a data mover. A stack logic may identify a location of a seed useful for determination of the integrity validation value. The location can be used to accumulate integrity validation value.

Block 406 may include determining integrity validation value prior to storing header and/or data portion(s) of a PDU into allocated region(s). For example, data mover logic may determine integrity validation value(s) for the header and/or data portions of a PDU before storing the header and/or data portions into allocated regions.

Block 408 may include indicating pass/fail of a portion of the PDU over which integrity validation took place. In some embodiments, a stack logic or data mover can determine pass/fail status of a PDU based on comparing an integrity validation value received with a PDU with a determined integrity validation value. The header and/or data integrity validation values received with a PDU may be identified by the stack logic or indicated by an iSCSI logic as stored in one or more region of memory.

Embodiments of the present invention are not limited for use with iSCSI or TCP/IP and can be used in environments compliant with other protocols.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
allocating a first memory region to store a header of a protocol data unit received using at least one network protocol unit;
determining a size of a payload portion of the protocol data unit based on the header; allocating a second memory region to store the payload portion based on the determined size, wherein the payload portion is received using at least one network protocol unit;
providing an identification of identifying a location of an integrity validation value within at least one of the first or second memory region; and requesting determination of an integrity validation value using a data mover logic; wherein the requesting determination of an integrity validation value comprises requesting determination of an integrity validation value for the payload portion and further comprising:
requesting determination of an integrity validation value over the payload portion of the protocol data unit using the data mover logic;
identifying a seed value in a third memory region; requesting the data mover logic to copy the data portion of the protocol data unit to the second memory region;
and requesting the data mover logic to determine the integrity validation value in part using the third region; the data mover logic retrieving an integrity validation seed value from the third memory region; the data mover logic writing the determined integrity validation value to the third memory region;
comparing the determined integrity validation value with the integrity validation value in the second memory region; and indicating pass or fail based on the comparing.

2. The method of claim 1, wherein the requesting determination of an integrity validation value comprises requesting determination of an integrity validation value for the header portion and further comprising: requesting determination of an integrity validation value of the header portion using the data mover logic; identifying a seed value in a third memory region; and requesting the data mover logic to copy the header portion to the first memory region and requesting the data mover logic to determine the integrity validation value in part using the third region.

3. The method of claim 2, further comprising: the data mover logic retrieving an integrity validation seed value from the third memory region;
the data mover logic writing the determined integrity validation value to the third memory region; comparing the determined integrity validation value with the integrity validation value in the first memory region; and indicating pass or fail based on the comparing.

4. The method of claim 1, wherein the first region comprises a maximum size of a header portion of the protocol data unit under applicable protocol.

5. The method of claim 1, wherein the first region includes an integrity validation value for the header portion transmitted with the protocol data unit.

6. The method of claim 1, wherein the second region includes an integrity validation value for the payload portion transmitted with the protocol data unit.

7. The method of claim 1, wherein the integrity validation value comprises a cyclical redundancy checking (CRC) value.

8. A system comprising:
a host system comprising a memory and a data mover logic;
a network component communicatively coupled to the host system to provide received network protocol units for storage in the memory, wherein the host system includes:
logic to allocate a first region in the memory to store a header of a protocol data unit received using at least one network protocol unit,
logic to determine a size of a payload portion of the protocol data unit based on the header,
logic to allocate a second region in the memory to store the payload portion based on the determined size, wherein the payload portion is received using at least one network protocol unit,
logic to provide an identification of identify a location of an integrity validation value within at least one of the first or second region, and
logic to request determination of an integrity validation value using the data mover logic;
and a network medium communicatively coupled to the network component; wherein the data mover logic is to retrieve an integrity validation seed value from a third memory region and the data mover logic is to write determined integrity validation value to the third memory region and further comprising:
logic to compare the determined integrity validation value with the integrity validation value in the first memory region;

and logic to indicate pass or fail based on the comparison.

9. The system of claim 8, wherein the data mover logic is to retrieve an integrity validation seed value from a third memory region and the data mover logic is to write determined integrity validation value to the third memory region and further comprising: logic to compare the determined integrity validation value with the integrity validation value in the second memory region; and logic to indicate pass or fail based on the comparison.

10. The system of claim 8, wherein the data mover logic comprises a direct memory access engine.

11. A method comprising:
prior to arrival at a network interface of the at least one network protocol unit, an iSCSI logic allocating a first memory region to store a header portion of a protocol data unit received using at least one network protocol unit;
the iSCSI logic allocating a second memory region to store a payload portion of the protocol data unit, wherein the payload portion is received using at least one network protocol unit and wherein the second region comprises a maximum size of a payload portion of a protocol data unit under an applicable protocol;
the iSCSI logic requesting a TCP stack logic to determine integrity validation values for at least one of the header and data portion;
and the iSCSI logic indicating to the TCP stack logic that the first memory region includes a start of a header of a network protocol unit; the stack logic requesting a data mover logic to determine an integrity validation value over one or more portion of the protocol data unit in a course of copying portions of the protocol data unit into any of the first and second regions, wherein the stack logic requesting includes the stack logic identifying a location of one or more integrity validation value included with the protocol data unit wherein identifying a location of one or more integrity validation values included with the protocol data unit comprises:
the stack logic inspecting the protocol data unit to identify a location of one or more integrity validation values included with the protocol data unit based at least on any of:
a predetermined header size, information in the header indicating the size of the data, and one or more integrity validation value being located at a set location relative to the header and data.

12. The method of claim 11, wherein the requesting a stack logic to determine integrity validation values for at least one of the header and data portion comprises requesting determination of an integrity validation value for the header portion and further comprising: requesting determination of an integrity validation value of the header portion using a data mover logic; identifying a seed value in a third memory region; and requesting the data mover logic to copy the header portion to the first memory region and requesting the data mover logic to determine the integrity validation value in part using the third region.

13. The method of claim 12, further comprising: the data mover logic retrieving an integrity validation seed value from the third memory region; the data mover logic writing the determined integrity validation value to the third memory region; comparing the determined integrity validation value with the integrity validation value in the first memory region; and indicating pass or fail based on the comparing.

14. The method of claim 11, wherein the requesting a stack logic to determine integrity validation values for at least one of the header and data portion comprises requesting determination of an integrity validation value for the data portion and further comprising: requesting determination of an integrity validation value over the data portion of the protocol data unit using the data mover logic; identifying a seed value in a third memory region; and requesting the data mover logic to copy the data portion of the protocol data unit to the second memory region and requesting the data mover logic to determine the integrity validation value in part using the third region.

15. The method of claim 14, further comprising: the data mover logic retrieving an integrity validation seed value from the third memory region; the data mover logic writing the determined integrity validation value to the third memory region; comparing the determined integrity validation value with the integrity validation value in the second memory region; and indicating pass or fail based on the comparing.

16. The method of claim 11, wherein the first region includes an integrity validation value for the header portion transmitted with the protocol data unit.

17. The method of claim 11, wherein the second region includes an integrity validation value for the data portion transmitted with the protocol data unit.

18. The method of claim 11, wherein the integrity validation value comprises a cyclical redundancy checking (CRC) value.

19. A system comprising:
a host system comprising a memory and a data mover logic;
a network component communicatively coupled to the host system to provide received network protocol units for storage in the memory, wherein the host system includes:
logic to allocate a first memory region to store a header portion of a protocol data unit received using at least one network protocol unit prior to arrival at a network interface of the at least one network protocol unit,
logic to allocate a second memory region to store a data portion of the protocol data unit, wherein the data portion is received using at least one network protocol unit and wherein the second region comprises a maximum size of a data portion of a protocol data unit under an applicable protocol,
logic to request a stack logic to determine integrity validation values for at least one of the header and data portion,
and logic to indicate to the stack logic that the first memory region includes a start of the header of a received network protocol unit;
a network medium communicatively coupled to the network component; wherein the stack logic is to request the data mover logic to determine an integrity validation value over one or more portion of the protocol data unit in a course of copying portions of the protocol data unit into any of the first and second regions, wherein to request, the stack logic is to identify a location of one or more integrity validation values included with the protocol data unit;
wherein to identify a location of one or more integrity validation values included with the protocol data unit, the stack logic is to inspect the protocol data unit to identify a location of one or more integrity validation values included with the protocol data unit based at least on any of: a predetermined header size, information in the header indicating the size of the data, and one or more integrity validation values being located at a set location relative to the header and data.

20. The system of claim 19, wherein the data mover logic is to retrieve an integrity validation seed value from a third memory region and the data mover logic is to write determined integrity validation value to the third memory region and further comprising: logic to compare the determined integrity validation value with the integrity validation value in the first memory region; and logic to indicate pass or fail based on the comparison.

21. The system of claim 19, wherein the data mover logic is to retrieve an integrity validation seed value from a third memory region and the data mover logic is to write determined integrity validation value to the third memory region and further comprising: logic to compare the determined integrity validation value with the integrity validation value in the second memory region; and logic to indicate pass or fail based on the comparison.

22. The system of claim 19, wherein the data mover logic comprises a direct memory access engine.

* * * * *